(12) United States Patent
Nakaue et al.

(10) Patent No.: US 9,606,684 B2
(45) Date of Patent: Mar. 28, 2017

(54) TOUCH PANEL CONTROLLER, TOUCH PANEL DEVICE, AND ELECTRONIC INFORMATION DEVICE

(71) Applicant: SHARP KABUSHIKI KAISHA, Osaka-shi, Osaka (JP)

(72) Inventors: Eiji Nakaue, Osaka (JP); Shohji Sakurai, Osaka (JP); Mutsumi Hamaguchi, Osaka (JP); Shinji Amano, Osaka (JP); Narakazu Shimomura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/410,464

(22) PCT Filed: Jun. 18, 2013

(86) PCT No.: PCT/JP2013/066718
§ 371 (c)(1),
(2) Date: Dec. 22, 2014

(87) PCT Pub. No.: WO2014/002827
PCT Pub. Date: Jan. 3, 2014

(65) Prior Publication Data
US 2015/0363021 A1 Dec. 17, 2015

(30) Foreign Application Priority Data
Jun. 27, 2012 (JP) .................. 2012-144726

(51) Int. Cl.
*G06F 3/045* (2006.01)
*G06F 3/044* (2006.01)
*G06F 3/041* (2006.01)
*G09G 5/00* (2006.01)
*G09G 5/18* (2006.01)

(52) U.S. Cl.
CPC ............ *G06F 3/044* (2013.01); *G06F 3/0412* (2013.01); *G06F 3/0416* (2013.01); *G09G 5/003* (2013.01); *G09G 5/18* (2013.01); *G09G 2300/04* (2013.01)

(58) Field of Classification Search
None
See application file for complete search history.

(56) References Cited

U.S. PATENT DOCUMENTS 6,046,620 A * 4/2000 Relph .................... H03K 5/133
327/277
6,320,572 B1 * 11/2001 Takabayashi ........ G09G 3/3611
345/204

(Continued)

FOREIGN PATENT DOCUMENTS

JP 2000-221928 A 8/2000
JP 2002-140031 A 5/2002
(Continued)

*Primary Examiner* — Christopher R Lamb
(74) *Attorney, Agent, or Firm* — Birch, Stewart, Kolasch & Birch, LLP

(57) ABSTRACT

The present invention provides a touch panel controller for controlling even a large touch panel with little EMI. The touch panel controller of the present invention includes a plurality of driving circuits (DC1 through DCm) for driving respective drive lines (DL1 through DLm) of a capacitive touch panel unit 2 by supplying driving signals (Ds) to the respective drive lines (DL1 through DLm), and a rise/fall time of each of the driving signals (Ds) is variable.

6 Claims, 11 Drawing Sheets

(56) References Cited

U.S. PATENT DOCUMENTS

| | | | |
|---|---|---|---|
| 6,697,041 B1 | 2/2004 | Tamai et al. | |
| 2002/0060592 A1* | 5/2002 | Shimoda | H03K 5/135 327/170 |
| 2009/0167720 A1* | 7/2009 | Geaghan | G01D 5/24 345/174 |
| 2010/0053097 A1* | 3/2010 | Goh | G06F 3/0416 345/173 |
| 2010/0085324 A1 | 4/2010 | Noguchi et al. | |
| 2011/0210939 A1* | 9/2011 | Reynolds | G06F 3/0418 345/174 |
| 2011/0316821 A1 | 12/2011 | Suzuki et al. | |
| 2013/0021303 A1* | 1/2013 | Martin | G06F 1/3262 345/178 |
| 2013/0057511 A1* | 3/2013 | Shepelev | G06F 3/044 345/174 |
| 2013/0063404 A1* | 3/2013 | Jamshidi Roudbari | G06F 3/044 345/204 |

FOREIGN PATENT DOCUMENTS

| | | |
|---|---|---|
| JP | 2010-92275 A | 4/2010 |
| JP | 2010-191872 A | 9/2010 |
| JP | 2011-3071 A | 1/2011 |
| JP | 2011-257882 A | 12/2011 |
| JP | 2012-8286 A | 1/2012 |
| JP | 2012-234475 A | 11/2012 |
| JP | 2014-10505 A | 1/2014 |

* cited by examiner

TOUCH PANEL CONTROLLER, TOUCH PANEL DEVICE, AND ELECTRONIC INFORMATION DEVICE

TECHNICAL FIELD

The present invention relates to a touch panel controller, a touch panel device, and an electronic information device. In particular, the present invention relates to (i) a touch panel controller for driving a capacitive touch panel, (ii) a capacitive touch panel device, and (iii) a capacitive electronic information device.

BACKGROUND ART

Conventionally, there have been various types of touch panel devices. Especially, a capacitive touch panel device, which utilizes electrostatic capacitance, achieves greater convenience because an operator can carry out direct touch operation by the fingertip or can carry out touch operation with the use of a simple stylus pen that is made of an electrically conductive material.

In general, a capacitive touch panel device includes (i) a touch panel unit in which a plurality of drive lines (first electrode) and a plurality of sense lines (second electrode) intersect with each other (like grade separation) and (ii) a touch panel controller for controlling the touch panel unit. The touch panel controller applies driving signals to the plurality of drive lines and detects a touch location based on sensing signals (response signal) generated in the plurality of sense lines. Specifically, when an electrically conductive object approaches or makes contact with the touch panel unit, electrostatic capacitances generated at intersections of the plurality of drive lines and the plurality of sense lines are changed. From this, the touch panel controller detects a signal strength at coordinates of each of the intersections of the plurality of drive lines and the plurality of sense lines in the touch panel unit based on the sensing signals generated in the plurality of sense lines, and the touch panel controller can thus detect a touch location.

With regard to the touch panel controller for controlling a capacitive touch panel, various kinds of configurations have been proposed. For example, Patent Literature 1 discloses a touch detection device for improving an S/N ratio and detection accuracy in detecting a sensing signal. As illustrated in (a) through (d) of FIG. 11, the touch detection device of Patent Literature 1 includes n-pieces of driving electrodes E1 arranged in a scanning direction, a detection drive scan section 111, a plurality of detection electrodes E2, and k-pieces of voltage detectors DET. The detection drive scan section 111 (i) selects, from the n-pieces of driving electrodes E1, an AC (alternate current) driving electrode unit EU that contains sequential m (2≤m<n) pieces of driving electrodes and (ii) drives the AC driving electrode unit EU with an AC voltage. The detection drive scan section 111 carries out shift operation in which the selection target is changed in the scanning direction. Specifically, the detection drive scan section 111 repeats the shift operation such that at least one driving electrode is selected in both of any sequential two shift operations. Every time the detection drive scan section 111 carries out the shift operation, each of the voltage detectors DET compares an electric potential of a corresponding detection electrode E2 with a predetermined threshold Vt.

CITATION LIST

Patent Literature

[Patent Literature 1]
Japanese Patent Application Publication Tokukai No. 2010-92275 (Publication date: Apr. 22, 2010)

SUMMARY OF INVENTION

Technical Problem

According to the configuration disclosed in Patent Literature 1, a plurality of drive lines are simultaneously driven by an AC voltage (i.e., pulse-driven). In recent years, a panel size of a touch panel is being increased. Under the circumstances, there is a problem that, in a case where drive lines are simultaneously pulse-driven in a large touch panel, extraneous emission of an electromagnetic wave (EMI) from the touch panel is increased.

As above described, in the capacitive touch panel, it is necessary to apply pulse voltages to the drive lines, due to its operation principle. In view of EMI, the drive line is assumed to correspond to an antenna from which an electromagnetic wave is emitted. As the panel size of the touch panel is increased, an antenna length (drive line length) is increased, and accordingly emission efficiency of the antenna is heightened. Moreover, in a case where a size of a touch panel is increased without changing density of drive lines, the number of drive lines is increased, and accordingly the number of antennas to emit electromagnetic waves is also increased.

As such, the increase in size of the capacitive touch panel leads to the increase in emission efficiency of the antennas and to the increase in the number of the antennas, and therefore the problem occurs in which EMI from the touch panel is increased.

The present invention is accomplished in order to solve the problem, and its object is to provide a touch panel controller that can control even a large touch panel with little EMI.

Solution to Problem

In order to attain the object, a touch panel controller of the present invention includes a plurality of driving circuits that drive respective drive lines of a capacitive touch panel by supplying driving signals to the respective drive lines, a rise/fall time of each of the driving signals being variable.

Advantageous Effects of Invention

As above described, the touch panel controller of the present invention includes a plurality of driving circuits that drive respective drive lines of a capacitive touch panel by supplying driving signals to the respective drive lines, a rise/fall time of each of the driving signals being variable. This makes it possible to bring about an effect of providing a touch panel controller that can control even a large touch panel with little EMI.

DESCRIPTION OF EMBODIMENTS

EXAMPLE 1

The following description will discuss Example 1 of the present invention with reference to FIGS. 1 through 7. In the present Example, an electronic information device that includes a touch panel device of the present invention is a mobile phone.

(Configuration of Mobile Phone)

Figure 1:
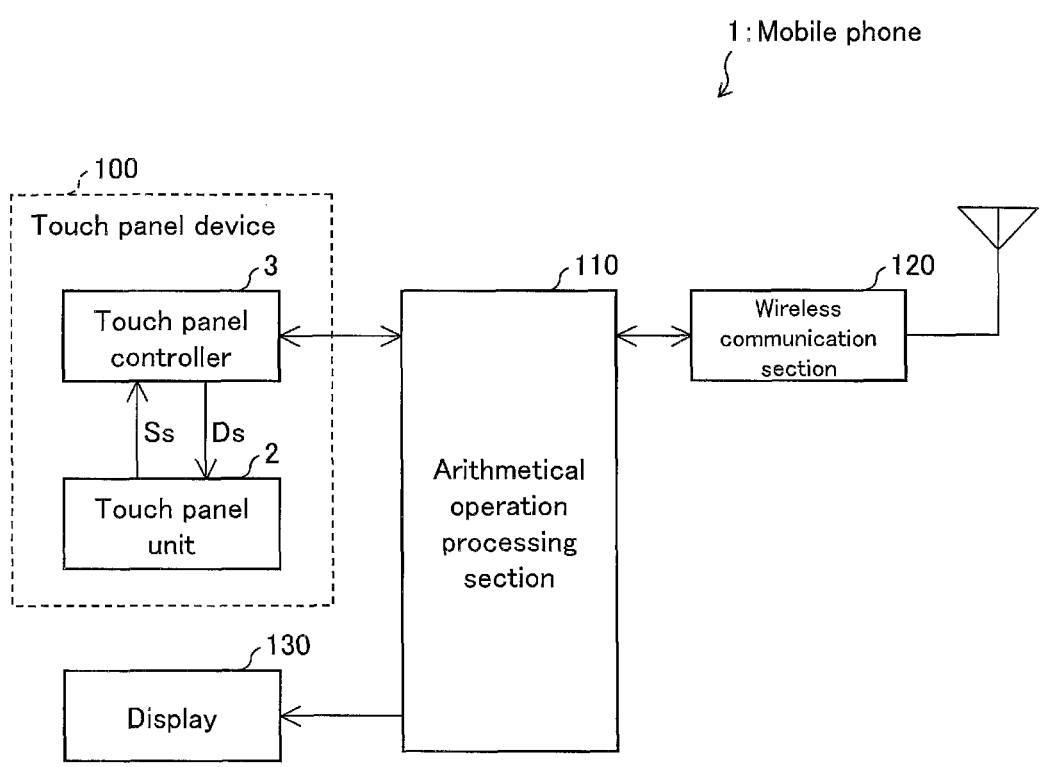
FIG. 1 is a block diagram schematically illustrating a configuration of a mobile phone, in accordance with Example 1 of the present invention.

FIG. 1 is a block diagram schematically illustrating a configuration of a mobile phone 1. The mobile phone 1 includes a touch panel device 100, an arithmetical operation processing section 110, a wireless communication section 120, and a display 130.

The arithmetical operation processing section 110 controls various functions of the mobile phone 1. For example, the arithmetical operation processing section 110 (i) controls execution of applications, (ii) controls the wireless communication section 120 to transmit/receive data, and (iii) controls the display 130 to display an image.

The wireless communication section 120 has a function to wirelessly transmit data to or receive data from an external apparatus.

The display 130 is preferably a flat display such as a liquid crystal display, an EL display, or a plasma display in order to reduce a thickness of the mobile phone 1.

The touch panel device 100 is an input apparatus provided to carry out touch operation on a display screen of the display 130 and includes a touch panel unit 2 and a touch panel controller 3.

The touch panel unit 2 is provided on the display 130. When touch operation has been carried out on the touch panel unit 2, the touch panel unit 2 outputs, to the touch panel controller 3, a signal that corresponds to a touch location. According to the present Example, the touch panel unit 2 is a capacitive touch panel.

The touch panel controller 3 has functions to (i) output pulse driving signals Ds to drive lines of the touch panel unit 2 and (ii) detect input operation on the touch panel unit 2 based on sensing signals Ss supplied from the touch panel unit 2. Details of the functions of the touch panel controller 3 will be described later.

(Overall Configuration of Touch Panel Device)

Figure 2:
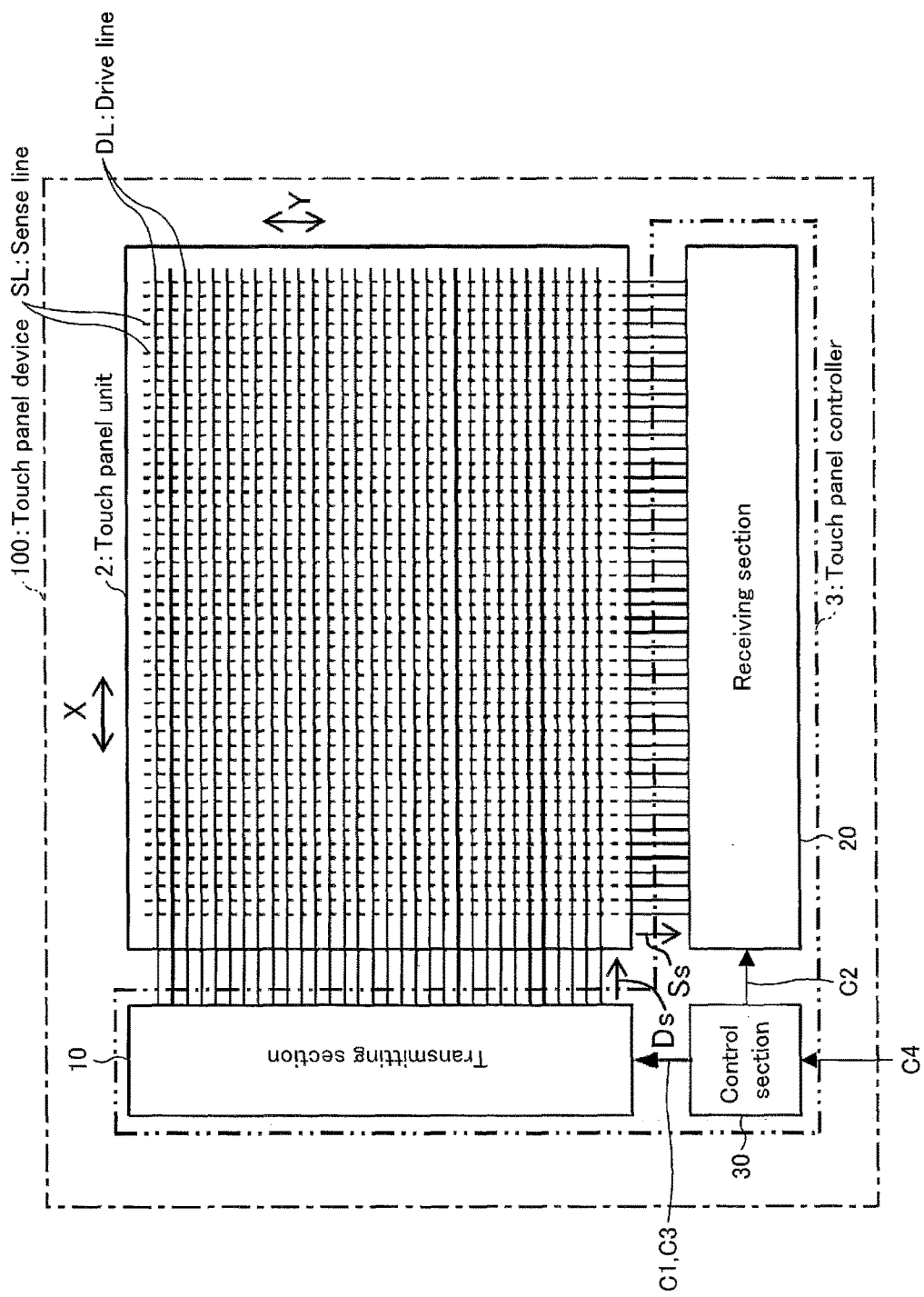
FIG. 2 is a view illustrating an overall configuration of a touch panel device included in the mobile phone.

FIG. 2 is a view illustrating an overall configuration of the touch panel device 100 included in the mobile phone 1. As illustrated in FIG. 2, the touch panel unit 2 of the touch panel device 100 includes (i) a plurality of drive lines (first electrode) DL which are arranged in parallel with each other and (ii) a plurality of sense lines (second electrode) SL which are arranged in parallel with each other. The plurality of drive lines DL and the plurality of sense lines SL intersect with each other (like grade separation). The plurality of drive lines DL extend in an X direction (i.e., a lateral direction in the drawing) and the plurality of sense lines SL extend in a Y direction (i.e., a longitudinal direction in the drawing) which is perpendicular to the X direction.

The touch panel controller 3 includes a transmitting section 10, a receiving section 20, and a control section 30. The transmitting section 10 applies a driving signal Ds to a drive line DL. The receiving section 20 receives a sensing signal Ss (i.e., response signal) which has been generated in a sense line SL in response to an applied driving signal Ds. The control section 30 controls operation of the transmitting section 10 by control signals C1 and C3, and controls operation of the receiving section 20 by a control signal C2.

When a finger of an operator or the like approaches the touch panel unit 2, an electrostatic capacitance (hereinafter, referred to as "intersection electrostatic capacitance") of a capacitor formed at an intersection of a drive line DL and a sense line SL is changed. The touch panel device 100 is configured to detect a change in intersection electrostatic capacitance based on a signal strength at coordinates of each of intersections of the plurality of drive lines DL and the plurality of sense lines SL in the touch panel unit 2, and the touch panel device 100 thus detects a touch location on the touch panel unit 2.

Figure 3:
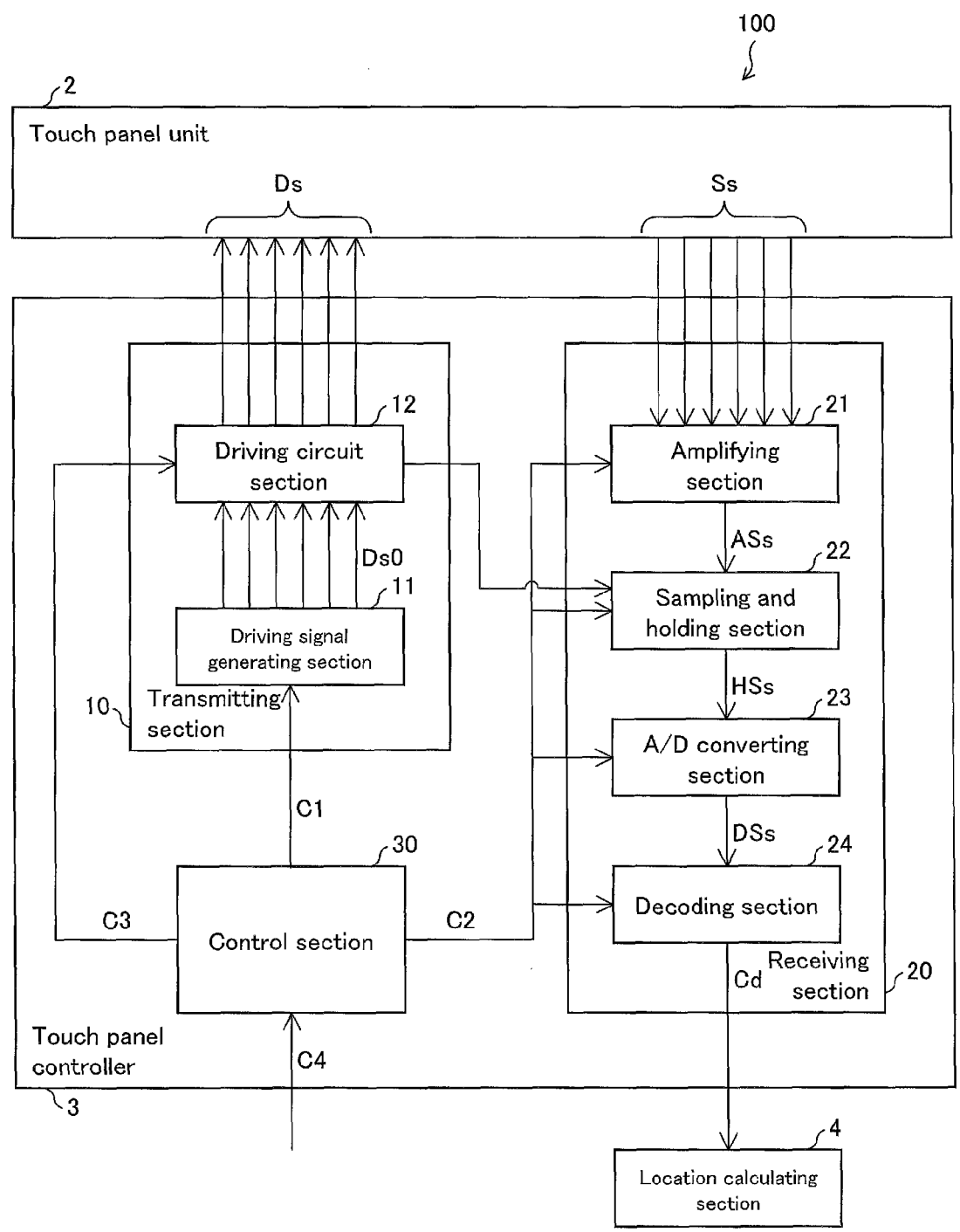
FIG. 3 is a block diagram illustrating a further detailed configuration of the touch panel device.

(Touch Panel Controller) FIG. 3 is a block diagram illustrating a further detailed configuration of the touch panel device 100. As above described with reference to FIG. 2, the touch panel controller 3 of the touch panel device 100 includes the transmitting section 10, the receiving section 20, and the control section 30, and driving signals Ds from the transmitting section 10 are applied to the respective plurality of drive lines DL, and sensing signals Ss are supplied to the receiving section 20 from the respective plurality of sense lines SL.

Here, the transmitting section 10 includes a driving signal generating section 11 and a driving circuit section 12. Based on a control signal C1 supplied from the control section 30, the driving signal generating section 11 generates driving signals Ds0, whose number is identical with that of the plurality of drive lines DL, with the use of a sequence signal (not illustrated). The control signal C1 is a clock signal that is a base of an operation timing.

Based on the driving signals Ds0 supplied from the driving signal generating section 11, the driving circuit section 12 generates driving signals Ds for actually driving the plurality of drive lines DL of the touch panel unit 2. The driving circuit section 12 is connected with the plurality of drive lines DL of the touch panel unit 2, and the driving signals Ds are applied to the respective plurality of drive lines DL.

Moreover, upon receipt of an external control signal C4, the control section 30 generates a control signal C3 and supplies the control signal C3 to the driving circuit section 12. As described later, the control section 30 can control, by the control signal C3, a rising/falling time of a driving signal Ds that is outputted from the driving circuit section 12.

The receiving section 20 includes an amplifying section 21, a sampling and holding section 22, an A/D converting section 23, and a decoding section 24. The amplifying section 21 is connected with the plurality of sense lines SL of the touch panel unit 2 and generates a sensing signal ASs by amplifying a sensing signal Ss supplied via each of the plurality of sense lines SL. The sampling and holding section 22 samples and holds a signal level of the sensing signal ASs, which has been amplified by the amplifying section 21. A sampling timing of the sampling and holding section 22 is based on a timing at which the driving circuit section 12 applies the driving signals Ds to the respective plurality of drive lines DL.

The A/D converting section 23 converts a signal HSs, which has been sampled and is held by the sampling and holding section 22, into a digital value so that the sensing signal ASs, which is an amplified analog signal, is converted into a digital signal DSs. The decoding section decodes the digital signal DSs, which has been generated by the A/D converting section 23, with the use of the sequence signal which has been used to generate the driving signals Ds, and outputs signals Cd that indicate signal strengths of respective intersections (represented by coordinates) in the touch panel unit 2.

Further, the touch panel device 100 includes a location calculating section 4 for calculating, based on magnitudes of signals Cd obtained by the receiving section 20, touch location coordinates that indicate a touch location on the touch panel unit 2.

As above described, in the touch panel device 100, a change in electrostatic capacitance is detected, which is caused at any of intersections of the plurality of drive lines DL and the plurality of sense lines SL by the finger of the operator, etc. approaching the touch panel unit 2, and thus a touch location of the operator can be detected.

(Configuration of Driving Circuit Section)

Figure 4:
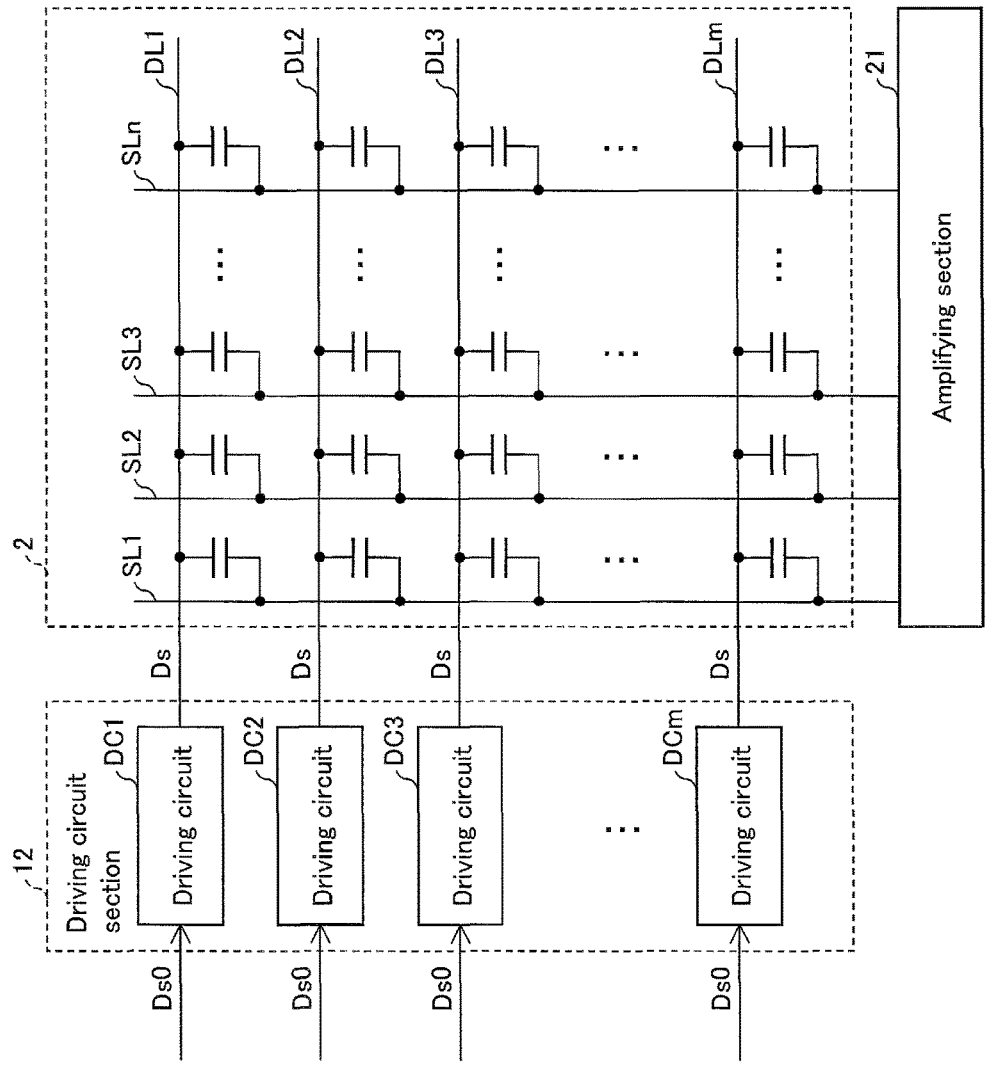
FIG. 4 is a view illustrating a configuration of a driving circuit section and a touch panel unit included in the touch panel device.

FIG. 4 is a view illustrating a configuration of the driving circuit section 12 and the touch panel unit 2 which are illustrated in FIG. 3. In the touch panel unit 2, m lines of drive lines DL1 through DLm (as the plurality of drive lines DL) are provided so as to extend in a lateral direction in the drawing, and n lines of sense lines SL1 through SLn (as the plurality of sense lines SL) are provided so as to extend in a longitudinal direction in the drawing.

The driving circuit section 12 includes m pieces of driving circuits DC1 through DCm whose number is identical with that of the drive lines DL. The driving circuits DC1 through DCm (i) are connected with the respective drive lines DL1 through DLm and (ii) output, based on driving signals Ds0 supplied from the driving signal generating section 11, driving signals Ds for actually driving the respective drive lines DL1 through DLm. The driving circuits DC1 through DCm have identical configurations, and the driving circuits DC1 through DCm are sometimes collectively referred to simply as "driving circuit DC".

The driving circuit DC is a characteristic part of the present invention. The following description will discuss the driving circuit DC with reference to FIGS. 5 through 7.

(Configuration of Driving Circuit)

Figure 5:
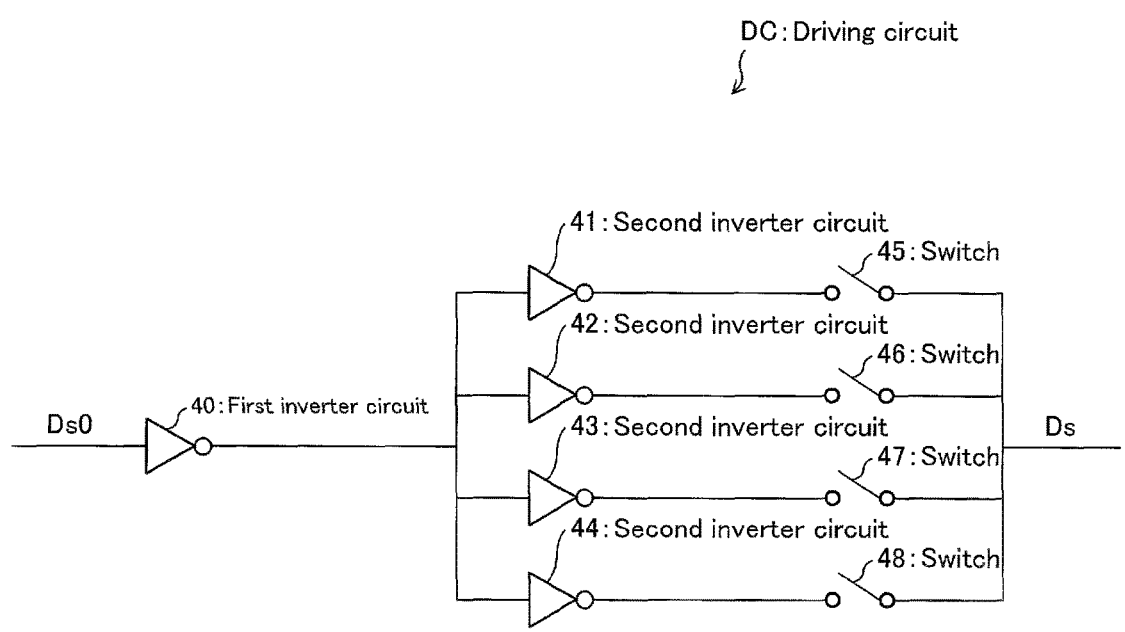
FIG. 5 is a circuit diagram illustrating a concrete configuration of a driving circuit in the driving circuit section.

FIG. 5 is a circuit diagram illustrating a concrete configuration of the driving circuit DC. The driving circuit DC includes a first inverter circuit 40, four second inverter circuits 41 through 44, and four switches 45 through 48. The driving circuit DC serves as a buffer circuit that amplifies a driving signal Ds0 supplied from the driving signal generating section 11 (see FIG. 3) and thus generates a driving signal Ds for driving a drive line DL.

An input terminal of the first inverter circuit 40 serves as an input terminal of the driving circuit DC, and a driving signal Ds0 is supplied to the first inverter circuit 40 via the input terminal. The second inverter circuits 41 through 44 are connected in series with the respective switches 45 through 48. This constitutes four series circuits, i.e., a series circuit of the second inverter circuit and the switch 45, a series circuit of the second inverter circuit 42 and the switch 46, a series circuit of the second inverter circuit 43 and the switch 47, and a series circuit of the second inverter circuit 44 and the switch 48. The four series circuits are connected in parallel with each other between an output terminal of the first inverter circuit 40 and an output terminal of the driving circuit DC.

The switches 45 through 48 are controlled to be ON/OFF by a 4-bit control signal C3 supplied from the control section 30 illustrated in FIG. 3.

As such, the driving circuit DC has a two-stage configuration, i.e., the first inverter circuit 40 and the second inverter circuits 41 through 44, and therefore a polarity of a driving signal Ds0 is identical with that of a driving signal Ds. Note that the number of the second inverter circuits and the number of the switches are not limited to four.

Here, the second inverter circuits 41 through 44 are configured by respective transistors whose channel widths are different from each other. That is, a channel width of a transistor constituting the second inverter circuit 41, a channel width of a transistor constituting the second inverter circuit 42, a channel width of a transistor constituting the second inverter circuit 43, and a channel width of a transistor constituting the second inverter circuit 44 are different from each other.

Figure 6:
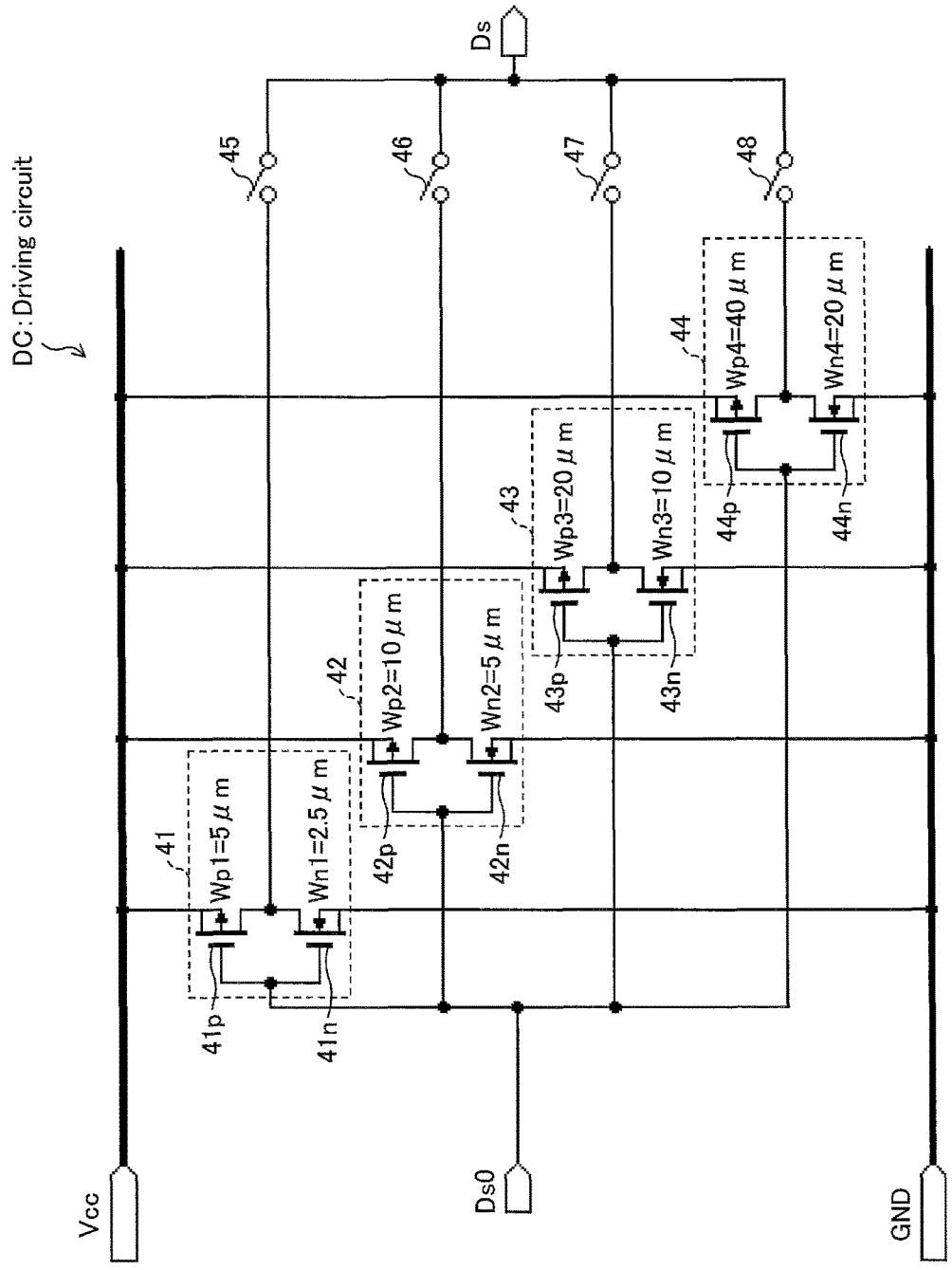
FIG. 6 is a circuit diagram illustrating a further detail of second inverter circuits in the driving circuit.

FIG. 6 is a circuit diagram illustrating a further detail of the second inverter circuits 41 through 44. As illustrated in FIG. 6, the second inverter circuit 41 is configured by a PMOS transistor 41p and an NMOS transistor 41n, the second inverter circuit 42 is configured by a PMOS transistor 42p and an NMOS transistor 42n, the second inverter circuit 43 is configured by a PMOS transistor 43p and an NMOS transistor 43n, and the second inverter circuit 44 is configured by a PMOS transistor 44p and an NMOS transistor 44n.

Here, assuming that channel widths of the PMOS transistors 41p, 42p, 43p, and 44p are Wp1, Wp2, Wp3, and Wp4, respectively, and channel widths of the NMOS transistors 41n, 42n, 43n, and 44n are Wn1, Wn2, Wn3, and Wn4, respectively, Wp1=5 um, Wn1=2.5 um, Wp2=10 um, Wn2=5 um, Wp3=20 um, Wn3=10 um, Wp4=40 um, and Wn4=20 um.

Figure 7:
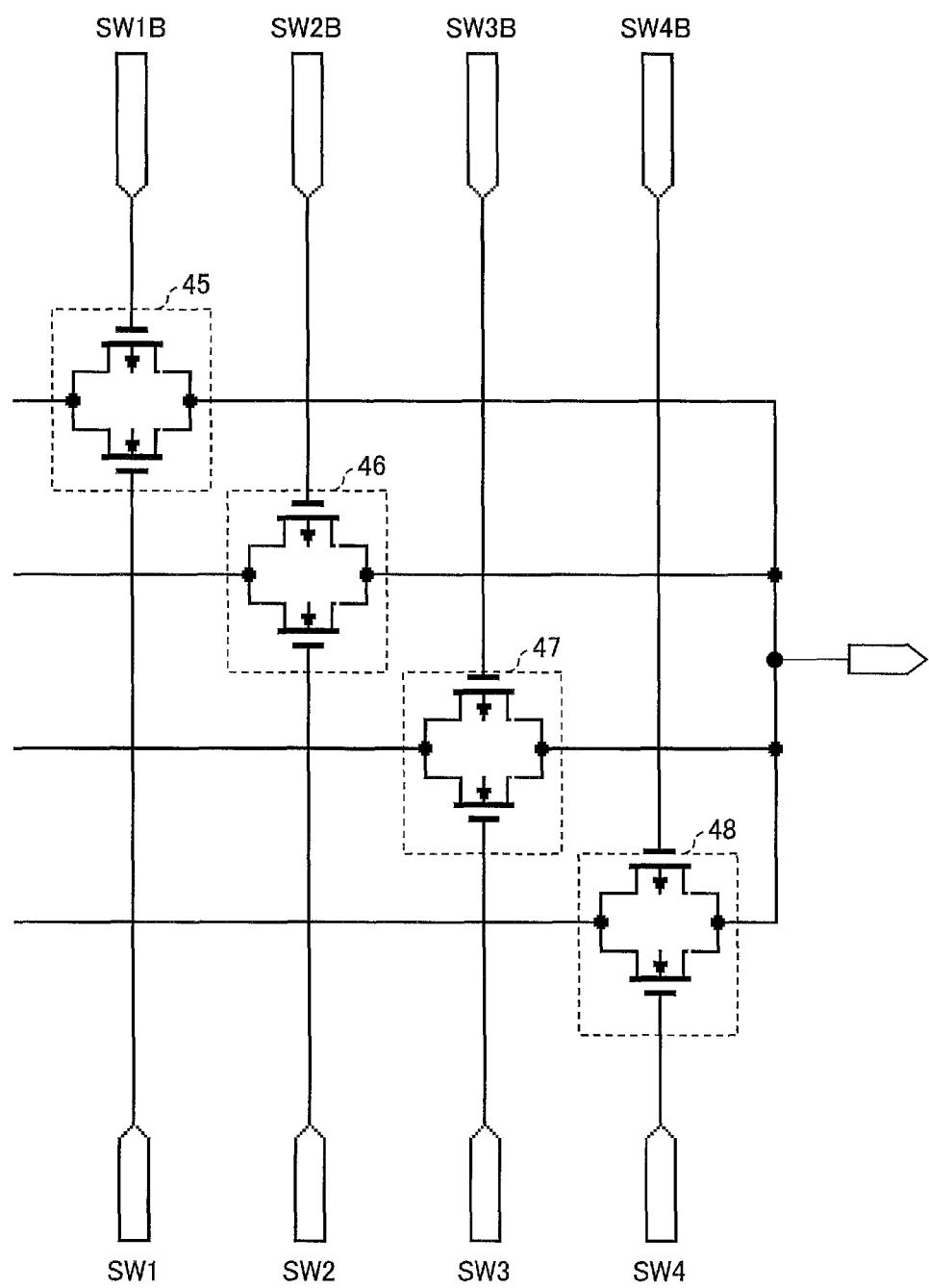
FIG. 7 is a circuit diagram illustrating a further detail of switches in the driving circuit.

As above described, the switches 45 through 48 are controlled to be ON/OFF by a 4-bit control signal C3. FIG. 7 is a circuit diagram illustrating a further detail of the switches 45 through 48.

Each of the switches 45 through 48 is configured by an analog switching circuit that is made up of an NMOS transistor and a PMOS transistor. The switches 45 through 48 are controlled to be ON/OFF by control signals SW1 through SW4 and SW1B through SW4B which have been generated from a control signal C3. The control signals SW1 through SW4 have a polarity different from that of the control signals SW1B through SW4B. For example, in a case where the control signal SW1 is HIGH, the control signal SW1B is LOW, and the switch 45 is ON. In a case where the control signal SW1 is LOW, the control signal SW1B is HIGH, and the switch 45 is OFF. Similarly, ON/OFF of each of the switches 46 through 48 is controlled in accordance with values of the control signals SW2 through SW4 and SW2B through SW4B. According to the present Example, the control signals SW1 through SW4 and SW1B through SW4B are generated with the use of the 4-bit control signal C3.

Note that, in a case where all the switches 45 through 48 are OFF, the drive line DL cannot be driven, and therefore ON/OFF of the switches 45 through 48 is controlled such that at least one of the switches 45 through 48 is ON. By thus controlling ON/OFF of the switches 45 through 48, a synthesis channel width Wp of the PMOS transistors of the respective second inverter circuits 41 through 44 is changed by 5 um in a range between 5 um and 75 um, and a synthesis channel width Wn of the NMOS transistors of the respective second inverter circuits 41 through 44 is changed by 2.5 um in a range between 2.5 um and 37.5 um. That is, as indicated in Table 1 below, each of the synthesis channel widths of the second inverter circuits 41 through 44 can be selected from 15 widths.

TABLE 1

| SW 4 | SW 3 | SW 2 | SW 1 | Switch 48 | Switch 47 | Switch 46 | Switch 45 | Wp (synthesis) μm | Wn (synthesis) μm |
|---|---|---|---|---|---|---|---|---|---|
| 0 | 0 | 0 | 1 |    |    |    | ON | 5.0  | 2.5  |
| 0 | 0 | 1 | 0 |    |    | ON |    | 10.0 | 5.0  |
| 0 | 0 | 1 | 1 |    |    | ON | ON | 15.0 | 7.5  |
| 0 | 1 | 0 | 0 |    | ON |    |    | 20.0 | 10.0 |
| 0 | 1 | 0 | 1 |    | ON |    | ON | 25.0 | 12.5 |
| 0 | 1 | 1 | 0 |    | ON | ON |    | 30.0 | 15.0 |
| 0 | 1 | 1 | 1 |    | ON | ON | ON | 35.0 | 17.5 |
| 1 | 0 | 0 | 0 | ON |    |    |    | 40.0 | 20.0 |
| 1 | 0 | 0 | 1 | ON |    |    | ON | 45.0 | 22.5 |
| 1 | 0 | 1 | 0 | ON |    | ON |    | 50.0 | 25.0 |
| 1 | 0 | 1 | 1 | ON |    | ON | ON | 55.0 | 27.5 |
| 1 | 1 | 0 | 0 | ON | ON |    |    | 60.0 | 30.0 |
| 1 | 1 | 0 | 1 | ON | ON |    | ON | 65.0 | 32.5 |
| 1 | 1 | 1 | 0 | ON | ON | ON |    | 70.0 | 35.0 |
| 1 | 1 | 1 | 1 | ON | ON | ON | ON | 75.0 | 37.5 |

(Reduction in EMI)

Here, a rise/fall time of the driving signal Ds outputted by the driving circuit DC varies in accordance with synthesis channel widths of the second inverter circuits 41 through 44 (hereinafter, simply referred to as "synthesis channel width"). More accurately, as the synthesis channel widths become smaller, the rise/fall time of the driving signal Ds becomes longer. As such, the control section 30 can control the rise/fall time of the driving signal Ds by selecting the synthesis channel widths based on the control signal C3.

Moreover, as the rise/fall time of the driving signal Ds becomes longer, extraneous emission of an electromagnetic wave (EMI) from the touch panel unit 2 is reduced. Therefore, it is possible to reduce EMI by setting the synthesis channel width to be smaller. Note that the rise/fall time of the driving signal Ds is determined based on the synthesis channel width, and therefore a channel width of the first inverter circuit 40 does not need to be variable.

In a case where a size of the touch panel unit 2 is large and the rise/fall time of the driving signal Ds is long, touch location detection sensitivity may be lowered because the drive line DL cannot be sufficiently driven (even though EMI does not cause a problem). In view of this, in the present Example, each of the synthesis channel widths can be set by selecting from 15 widths. According to the configuration, it is possible to secure sufficient touch location detection sensitivity while inhibiting EMI, by setting the synthesis channel widths to be relatively large.

The synthesis channel widths required to secure sufficient touch location detection sensitivity depend on (i) a time constant that is determined from resistance and capacitance of the drive line DL and the sense line SL and (ii) a pulse width time of the driving signal Ds which time the touch panel unit 2 requires. Therefore, concrete setting values of the synthesis channel widths cannot be definitely determined here but approximate synthesis channel widths required are as follows: that is, in a case where the touch panel unit 2 is 10 inches, Wp=5 um and Wn=2.5 um; in a case where the touch panel unit 2 is 20 inches, Wp=10 um and Wn=5 um; and in a case where the touch panel unit 2 is 60 inches, Wp=40 um and Wn=20 um. According to the present Example, 15 synthesis channel widths can be set, and it is therefore possible to drive plural types of touch panel units 2 having different panel sizes by the one (1) touch panel controller 3. This makes it possible to use the touch panel controller 3 in common, and it is therefore possible to reduce a cost of the touch panel device 100 and an electronic information device such as the mobile phone 1 that includes the touch panel device 100.

Note that, according to a conventional touch panel device, a driving circuit for driving a drive line is configured by a buffer that is made up of two inverter circuits. Therefore, a rise/fall time of a driving signal outputted from the driving circuit is constant, and therefore it is necessary to prepare a plurality of touch panel devices that have different driving circuits, depending on a panel size of a touch panel unit and an EMI criterion.

(Method for Determining Synthesis Channel Width)

The following description will discuss procedures to determine synthesis channel widths of the second inverter circuits 41 through 44.

First, synthesis channel widths are controlled to be maximum (that is, EMI becomes maximum) by an external control signal C4 illustrated in FIG. 3, and then EMI is measured and touch location detection sensitivity is confirmed. In a case where the measured EMI does not satisfy the criterion, an external control signal C4 is inputted again so that the synthesis channel widths become smaller by one level, and then EMI is measured and touch location detection sensitivity is confirmed again. This operation is repeated until the both items, i.e., the measured EMI and the touch location detection sensitivity satisfy the criterion. As such, it is possible to set synthesis channel widths that satisfy both EMI and touch location detection sensitivity (i.e., capability of driving the drive line DL).

By gradually changing each of the synthesis channel widths from the maximum value to smaller values, it is possible to select the synthesis channel widths with which the touch location detection sensitivity is highest while satisfying the EMI criterion.

(Additional Remarks)

Note that, in a case where the EMI criterion is prioritized over the touch location detection sensitivity, in contrast to the above, each of the synthesis channel widths is gradually changed from a smallest value to larger values, and synthesis channel widths can be selected with which EMI is smallest under a condition in which minimal touch location detection sensitivity can be obtained.

That is, the synthesis channel widths are controlled to be smallest (that is, EMI is smallest) by an external control signal C4, and then EMI is measured and touch location detection sensitivity is confirmed. In a case where the touch location detection sensitivity does not satisfy the criterion, an external control signal C4 is inputted again so that each of the synthesis channel widths becomes greater by one level, and then EMI is measured and touch location detection sensitivity is confirmed again. This operation is repeated until the both items, i.e., the measured EMI and the touch location detection sensitivity satisfy the criterion.

EXAMPLE 2

Figure 8:
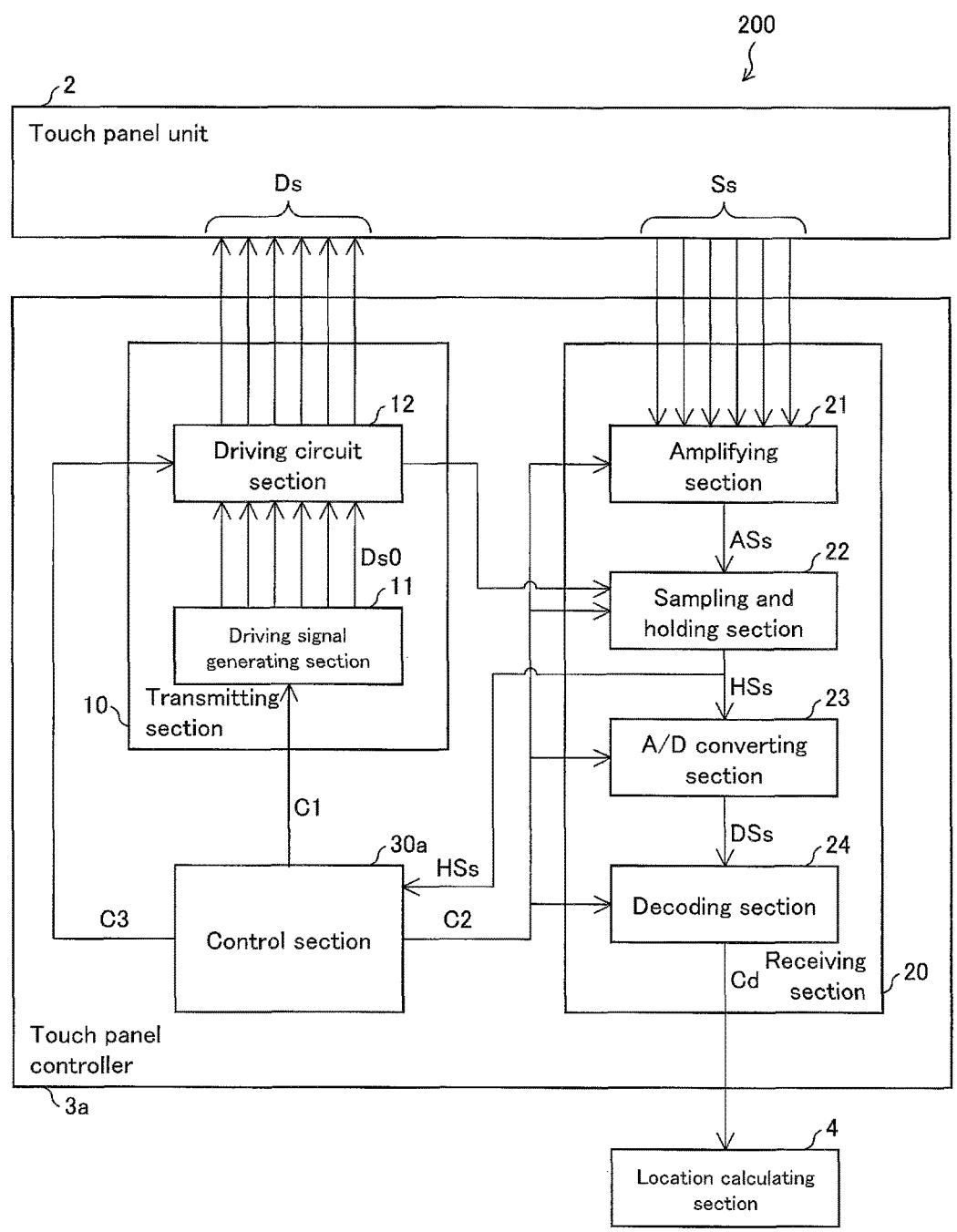
FIG. 8 is a block diagram illustrating a configuration of a touch panel device, in accordance with Example 2 of the present invention.
Figure 9:
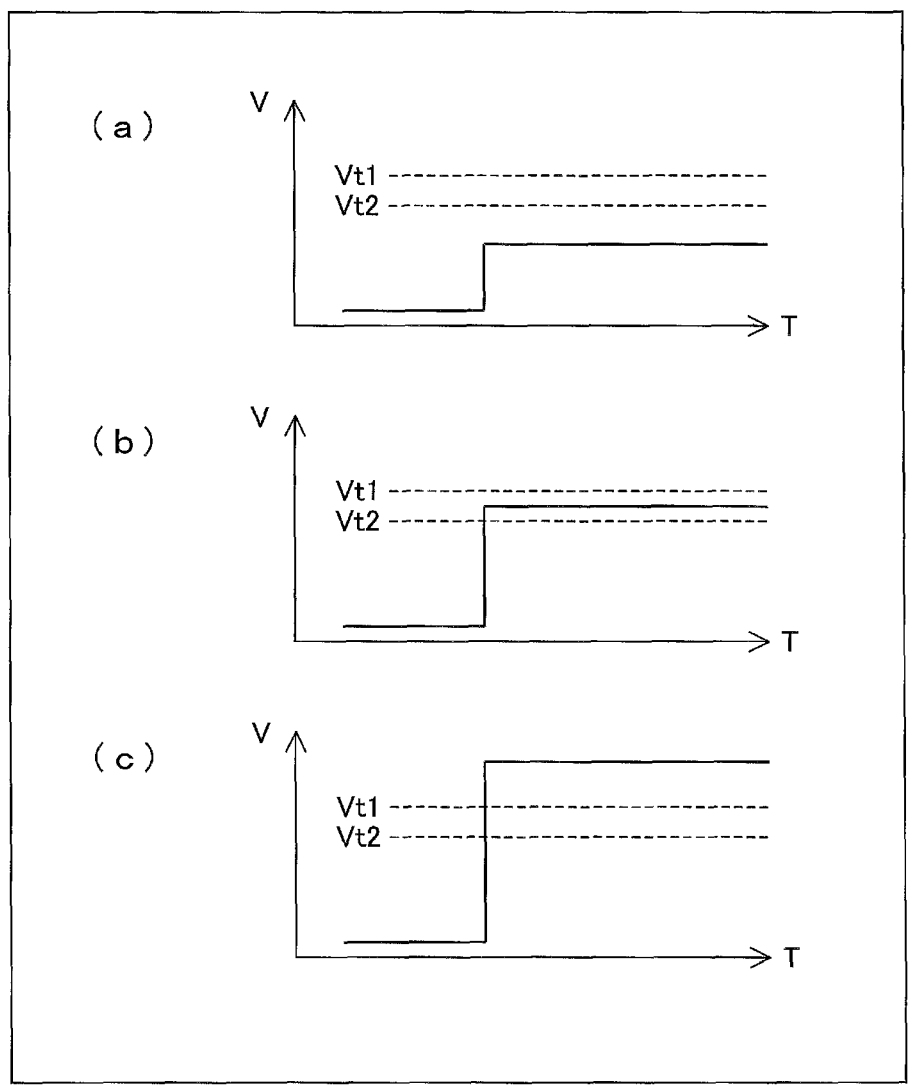
FIG. 9 is a view for explaining a setting of a synthesis channel width of second inverter circuits which is set based on an output signal from a sampling and holding section.
Figure 10:
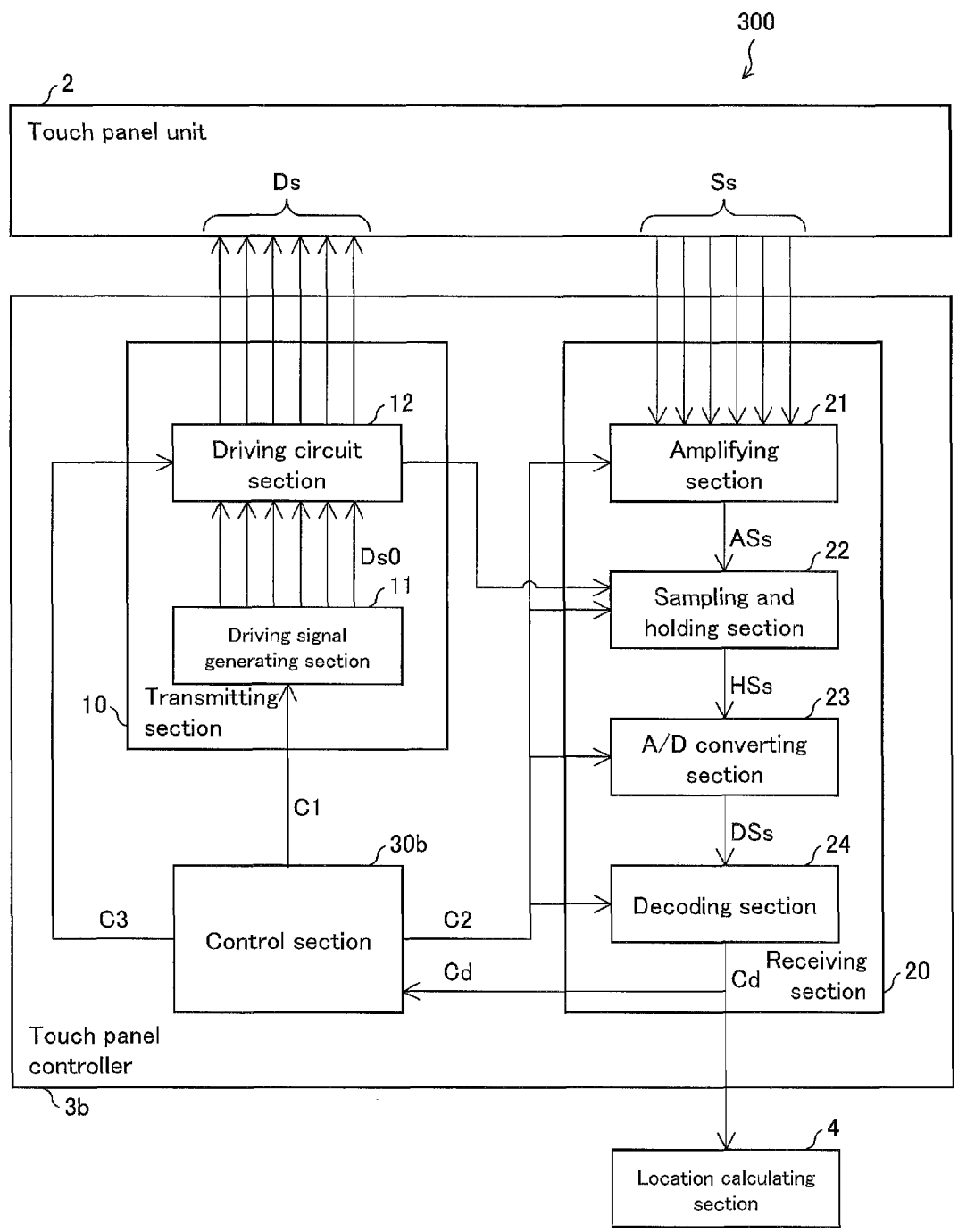
FIG. 10 is a block diagram illustrating a configuration of another touch panel device, in accordance with Example 2 of the present invention.
Figure 11:
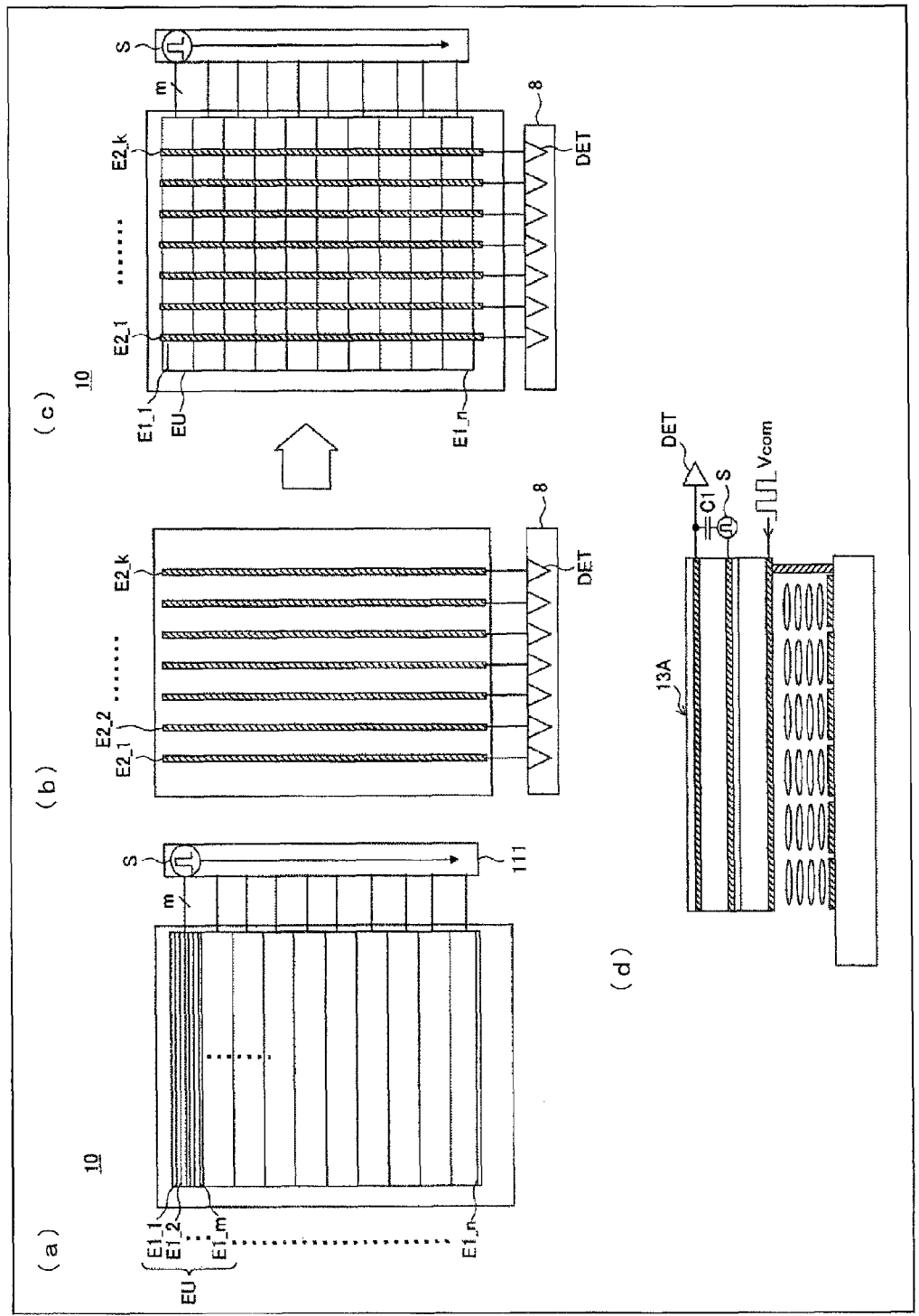
FIG. 11 is a view illustrating a configuration of a conventional touch panel device.

The following description will discuss Example 2 of the present invention, with reference to FIGS. 8 through 10. In the present Example, a touch panel device 200 is described which is a modification example of the touch panel device 100 of Example 1.

(Configuration of Touch Panel Device)

FIG. 8 is a block diagram illustrating a configuration of the touch panel device 200, in accordance with the present Example. The touch panel device 200 is different from the touch panel device 100 (illustrated in FIG. 3) in that the touch panel controller 3 is replaced with a touch panel controller 3a. The touch panel controller 3a is different from the touch panel controller 3 in that the control section 30 is replaced with a control section 30a. Constituent members of the touch panel device 200 other than the control section 30a are substantially identical with those of the touch panel device 100, and the same reference numerals are given to such constituent members, and descriptions of such members are omitted here.

To the control section 30a, a signal HSs, which is outputted from a sampling and holding section 22, is supplied instead of the external control signal C4 indicated in FIG. 3. Based on the signal HSs, the control section 30a generates a control signal C3 for controlling a rise/fall time of a driving signal Ds and supplies the control signal C3 to a driving circuit section 12.

(Overview of Method for Determining Synthesis Channel Width)

The control section 30a (i) changes, in stages, synthesis channel widths Wp and Wn of second inverter circuits 41 through 44 included in each of driving circuits DC (see FIG. 5) that constitute the driving circuit section and (ii) compares the signal HSs, which has been supplied from the sampling and holding section 22, with a predetermined expectation value. The comparison between the signal HSs and the expectation value can be carried out by, for example, a comparator circuit.

For example, the control section 30a compares the signal HSs with the expectation value while changing, in stages, each of the synthesis channel widths from a smallest value to larger values. This makes it possible to set minimal synthesis channel widths in a state where a predetermined output signal level is maintained. In a case where the synthesis channel widths are thus set, the synthesis channel widths are smallest under a condition in which predetermined touch location detection sensitivity or higher is secured, and therefore the rise/fall time of the driving signal Ds is longest, and extraneous emission of an electromagnetic wave (EMI) can be inhibited to a minimum.

According to the present Example, it is unnecessary to use the external control signal C4 illustrated in FIG. 3, and the touch panel controller 3a itself can select, based on a value of a signal HSs, synthesis channel widths of the second inverter circuits 41 through 44 which widths are optimal for driving a drive line DL.

In the present Example, as with Example 1, it is possible to reduce EMI, and it is possible to drive plural types of touch panel units 2 having different panel sizes with the one (1) touch panel controller 3a. This makes it possible to use the touch panel controller 3 in common, and it is therefore possible to reduce a cost of the touch panel device 200 and an electronic information device that includes the touch panel device 200.

(Concrete Example of Method for Determining Synthesis Channel Width)

The following description will discuss a concrete example of a method for determining synthesis channel widths, with reference to FIG. 9.

According to the present Example, two thresholds are set with respect to a signal (i.e., signal HSs) used to carry out feedback in the touch panel controller 3a, and optimal synthesis channel widths can be determined by comparing the signal HSs with the thresholds. As the two thresholds, a "maximum threshold Vt1 for satisfying EMI criterion" and a "minimum threshold Vt2 for satisfying touch location detection sensitivity" are set which satisfy a relation Vt1>Vt2. Concrete values of the respective thresholds Vt1 and Vt2 are determined in advance by prior evaluation, simulation, or the like.

First, smallest synthesis channel widths are selected and then a drive line DL of the touch panel unit 2 is driven. From this, when the receiving section 20 has received a sensing signal Ss from the sense line SL, a signal HSs is outputted from the sampling and holding section 22. The signal HSs is supplied to an A/D converting section 23 and to the control section 30a, and the control section 30a then compares the signal HSs with the thresholds Vt1 and Vt2.

Here, in a case of Vt2>HSs as illustrated in (a) of FIG. 9, the control section 30a determines that touch location detection sensitivity is insufficient, and switches ON/OFF of each of the switches 45 through 48 (see FIG. 5) so that each of the synthesis channel widths becomes greater by one level. After that, the drive line DL is driven and a sensing signal Ss is received again, and the control section 30a compares the signal HSs with the thresholds Vt1 and Vt2 again. Subsequently, this operation is repeated until Vt2<HSs<Vt1 is satisfied as illustrated in (b) of FIG. 9. This makes it possible to select synthesis channel widths with which EMI is smallest while minimal touch location detection sensitivity is secured.

In contrast to the above, each of the synthesis channel widths can be changed so as to be decreased from a maximum value. Specifically, first, largest synthesis channel widths are selected and then the drive line DL of the touch panel unit 2 is driven. From this, when the receiving section 20 has received a sensing signal Ss from the sense line SL, a signal HSs is outputted from the sampling and holding section 22. The signal HSs is supplied to the A/D converting section 23 and to the control section 30a, and the control section 30a then compares the signal HSs with the thresholds Vt1 and Vt2.

Here, in a case of HSs>Vt1 as illustrated in (c) of FIG. 9, the control section 30a determines that the EMI criterion is not satisfied, and switches ON/OFF of each of the switches 45 through 48 (see FIG. 5) so that each of the synthesis channel widths becomes smaller by one level. After that, the drive line DL is driven and a sensing signal Ss is received again, and the control section 30a compares the signal HSs with the thresholds Vt1 and Vt2 again. Subsequently, this operation is repeated until Vt2<HSs<Vt1 is satisfied as illustrated in (b) of FIG. 9. This makes it possible to select synthesis channel widths with which the EMI criterion is satisfied while highest touch location detection sensitivity is obtained.

MODIFICATION EXAMPLE

In the above Example, the control section 30a generates, with the use of the signal HSs supplied from the sampling and holding section, a control signal C3 for controlling a rise/fall time of the driving signal Ds. Note, however, that a feedback signal for the control section 30a to generate the control signal C3 is not limited to the signal HSs. As the feedback signal, for example, a signal Cd supplied from the decoding section 24 can be used.

FIG. 10 is a block diagram illustrating a configuration of a touch panel device 300, in accordance with the present Example. The touch panel device 300 is different from the touch panel device 200 illustrated in FIG. 8 in that the touch panel controller 3a is replaced with a touch panel controller 3b. The touch panel controller 3b is different from the touch panel controller 3a in that the control section 30a is replaced with a control section 30b. To the control section 30b, a signal Cd generated by the decoding section 24 is supplied. Based on the signal Cd, the control section 30b generates a control signal C3 for controlling a rise/fall time of a driving signal Ds, and supplies the control signal C3 to the driving circuit section 12.

The control section 30b changes, in stages, synthesis channel widths Wp and Wn of second inverter circuits 41 through 44 in each of driving circuits DC (see FIG. 5) that constitute the driving circuit section 12, and compares a signal Cd, which has been supplied from the decoding section 24, with a predetermined expectation value. The signal Cd can be compared with the expectation value with the use of, for example, a comparator circuit.

For example, the control section 30b compares the signal Cd with the expectation value while changing, in stages, each of the synthesis channel widths from a smallest value to larger values. This makes it possible to set minimal synthesis channel widths in a state where a predetermined output signal level is maintained. In a case where the synthesis channel widths are thus set, the synthesis channel widths are smallest under a condition in which predetermined touch location detection sensitivity or higher is secured, and therefore the rise/fall time of the driving signal Ds is longest, and extraneous emission of an electromagnetic wave (EMI) can be inhibited to a minimum. According to the touch panel device 300 also, it is unnecessary to use the external control signal C4 illustrated in FIG. 3, and the touch panel controller 3 itself can select, based on a value of a signal Cd, synthesis channel widths of the second inverter circuits 41 through 44 which widths are optimal for driving a drive line DL.

(Additional Remarks)

According to the present Example, the "maximum threshold Vt1 for satisfying EMI criterion" and the "minimum threshold Vt2 for satisfying touch location detection sensitivity" do not need to be constant and can be set as appropriate in accordance with a purpose of using the touch panel device. For example, in a case where high-speed operation is demanded, the threshold Vt1 is set to be higher and the threshold Vt2 is set to be lower so that the EMI criterion is eased for prioritizing the touch location detection sensitivity.

According to the present Example, the control signal C3 for controlling the rise/fall time of the driving signal Ds is generated with the use of the signal HSs supplied from the sampling and holding section 22 or the signal Cd supplied from the decoding section 24. Note, however, that the signal used to generate the control signal C3 is not limited to the signal HSs and the signal Cd. For example, an output signal of the receiving section 20 in which signal a strength of a sensing signal Ss is reflected (e.g., a digital signal DSs which is supplied from the A/D converting section 23) can be used as a feedback signal for generating a control signal C3.

[Main Points of Examples]

In the above described Examples, as illustrated in FIG. 5, the driving circuit DC includes the second inverter circuits 41 through 44 which are made up of respective transistors having different channel widths. Note, however, that the channel widths of the transistors constituting the respective second inverter circuits 41 through 44 can be identical channel widths. Even with such a configuration, each of the synthesis channel widths of the second inverter circuits 41 through 44 can be set to any of a plurality of values by controlling ON/OFF of each of the switches 45 through 48.

In the above described Examples, the rise/fall time of the driving signal Ds is variable by changing the synthesis channel widths of the second inverter circuits 41 through 44. Alternatively, it is possible to vary the rise/fall time of the driving signal Ds by changing synthesis channel lengths of the second inverter circuits 41 through 44. For example, the second inverter circuits 41 through 44 can be configured by respective transistors that have different channel lengths. In this case, as the synthesis channel length of the second inverter circuits 41 through 44 is set to be longer, the rise/fall time of the driving signal Ds becomes longer, and this makes it possible to reduce EMI.

In the above described Examples, the driving circuit DC includes the one (1) first inverter circuit 40 and the plurality of second inverter circuits (i.e., the second inverter circuits 41 through 44), as illustrated in FIG. 5. Note, however, that the configuration of the driving circuit is not limited to this. For example, the driving circuit can have a configuration in which a plurality of first inverter circuits and one (1) second inverter circuit are provided and the plurality of first inverter circuits are selectively operated. Alternatively, it is possible to employ a configuration in which (i) the number of first inverter circuits is identical with that of second inverter circuits, (ii) the first inverter circuits are connected in series with the respective second inverter circuits so as to configure a plurality of series circuits of the first inverter circuits and the second inverter circuits, and (iii) any of the plurality of series circuits is selected. With the configurations also, it is possible to set the rise/fall time of the driving signal to be variable by changing sizes (W/L) of transistors for outputting a driving signal.

In order to set the rise/fall time of the driving signal to be variable, it is possible to employ a configuration in which an impurity concentration of transistors for outputting a driving signal is changed or a thickness of gate oxide film is changed. For example, in the driving circuit DC illustrated in FIG. 5, the second inverter circuits 41 through 44 can be configured by respective transistors that have different impurity concentrations or different gate oxide film thicknesses. With the configuration also, the rise/fall time of the driving signal can be set to be variable.

[Main Points of Embodiments]

In order to attain the object, the touch panel controller of the present invention includes a plurality of driving circuits that drive respective drive lines of a capacitive touch panel by supplying driving signals to the respective drive lines, a rise/fall time of each of the driving signals being variable.

According to the configuration, the rise/fall time of the driving signal for driving the drive line is variable, and it is therefore possible to reduce EMI by setting the rise/fall time of the driving signal to be longer. From this, it is possible to provide the touch panel controller that can control even a large touch panel with little EMI.

The touch panel controller of the present invention preferably includes a control section that controls the rise/fall time, each of the plurality of driving circuits including a plurality of inverter circuits, and the control section selectively operating the plurality of inverter circuits.

According to the configuration, any of the plurality of inverter circuits used to output a driving signal is selected by the control section, and it is therefore possible to set the rise/fall time of the driving signal to be variable.

According to the touch panel controller of the present invention, it is preferable that the plurality of inverter circuits include (i) one (1) first inverter circuit, (ii) a plurality of second inverter circuits, and (iii) a plurality of switches whose number is identical with that of the plurality of second inverter circuits; an input terminal of the first inverter circuit serves as an input terminal of the driving circuit; the plurality of second inverter circuits are connected in series with the respective plurality of switches so as to constitute a plurality of series circuits whose number is identical with that of the plurality of second inverter circuits and that of the plurality of switches; the plurality of series circuits are connected in parallel with each other between an output terminal of the first inverter circuit and an output of the driving circuit; and the control section controls ON/OFF of each of the plurality of switches.

According to the configuration, ON/OFF of each of the plurality of switches is controlled by the control section, and accordingly a second inverter circuit(s) to be connected in series with the first inverter circuit is selected. Here, even in a case where the plurality of second inverter circuits are configured by respective transistors having different sizes or the plurality of second inverter circuits are configured by respective transistors having identical sizes, it is possible to change a synthesis transistor size of a selected second inverter circuit(s) by changing the number of second inverter circuit(s) to be selected. As such, the control section can change the rise/fall time of the driving signal.

According to the touch panel controller of the present invention, it is preferable that the plurality of second inverter circuits are configured by respective transistors that have different sizes.

According to the configuration, it is possible to change a synthesis transistor size (W/L) of a selected second inverter circuit by switching a second inverter circuit(s) to be selected. In a case where the transistor size (W/L) is small, the rise/fall time of the driving signal becomes longer. As such, the control section can change the rise/fall time of the driving signal.

According to the touch panel controller of the present invention, it is preferable that the plurality of second inverter circuits are configured by respective transistors having different channel widths.

According to the configuration, it is possible to change a synthesis channel width of a selected second inverter circuit by switching a second inverter circuit(s) to be selected. As such, the control section can change the rise/fall time of the driving signal.

According to the touch panel controller of the present invention, the control section can control the rise/fall time based on a control signal that has been supplied from outside of the touch panel controller.

According to the touch panel controller of the present invention, it is preferable that the touch panel controller includes a receiving section that receives a sensing signal supplied via a sense line of the capacitive touch panel and thus detects electrostatic capacitance of the capacitive touch panel, the control section controlling the rise/fall time based on an output signal supplied from the receiving section.

According to the configuration, the control section can control the rise/fall time without a control signal supplied from outside of the touch panel controller.

The touch panel device of the present invention includes a capacitive touch panel; and a touch panel controller that includes a plurality of driving circuits for driving respective drive lines of the capacitive touch panel by supplying driving signals to the respective drive lines, the touch panel controller being the touch panel controller of the present invention.

The electronic information device of the present invention includes a display for displaying an image; and a touch panel device, the touch panel device including: a capacitive touch panel which is provided on the display, and a touch panel controller that includes a plurality of driving circuits for driving respective drive lines of the capacitive touch panel by supplying driving signals to the respective drive lines, the touch panel controller being the touch panel controller of the present invention.

According to the configuration, the rise/fall time of the driving signal is variable in the touch panel controller of the present invention, and therefore EMI can be adjusted in accordance with the EMI criterion and the touch location detection sensitivity. From this, it is possible to drive plural types of touch panels with one (1) touch panel controller. This makes it possible to use the touch panel controller in common, and it is therefore possible to reduce a cost of the touch panel device and an electronic information device including the touch panel device.

The present invention is not limited to the above described Examples, but can be altered by a skilled person in the art within the scope of the claims. An embodiment derived from a proper combination of technical means disclosed in respective different Examples is also encompassed in the technical scope of the present invention.

INDUSTRIAL APPLICABILITY

The present invention is applicable to not only a mobile phone but also any electronic information device that includes a touch panel device.

REFERENCE SIGNS LIST

1: Mobile phone (electronic information device)
2: Touch panel unit (touch panel)
3: Touch panel controller
3a: Touch panel controller
3b: Touch panel controller
4: Location calculating section
10: Transmitting section
11: Driving signal generating section
12: Driving circuit section 20: Receiving section
21: Amplifying section
22: Sampling and holding section
23: A/D converting section
24: Decoding section
30: Control section
30a: Control section
30b: Control section
40: First inverter circuit
41 through 44: Second inverter circuit
41n, 42n, 43n, and 44n: NMOS transistor
41p, 42p, 43p, and 44p: PMOS transistor
45 through 48: Switch
100: Touch panel device
110: Arithmetical operation processing section
120: Wireless communication section
130: Display
200: Touch panel device
300: Touch panel device
ASs: Sensing signal
C1 through C3: Control signal
C4: External control signal
Cd: Signal
DC: Driving circuit
DC1 through DCm: Driving circuit
DL: Drive line
DL1 through DLm: Drive line
DSs: Digital signal
Ds: Driving signal
Ds0: Driving signal
HSs: Signal
SL: Sense line
SL1 through SLn: Sense line
SW1 through SW4: Control signal
SW1B through SW4B: Control signal
Ss: Sensing signal
Vt1: Maximum threshold
Vt2: Minimum threshold
Wn: Synthesis channel width
Wp: Synthesis channel width

The invention claimed is:

1. A touch panel controller comprising:
a plurality of driving circuits that drive respective drive lines of a capacitive touch panel by supplying driving signals to the respective drive lines,
length of rise time and fall time of each of the driving signals being variable;
said controller further comprising:
a control section that controls the lengths of rise time and fall time,
each of the plurality of driving circuits including a plurality of inverter circuits which are configured to change the length of rise time and fall time,
the plurality of inverter circuits include (i) one (1) first inverter circuit, (ii) a plurality of second inverter circuits, and (iii) a plurality of switches whose number is identical with that of the plurality of second inverter circuits;
an input terminal of the first inverter circuit serving as an input terminal of the driving circuit,
the plurality of second inverter circuits being configured by respective transistors having different channel widths,
the plurality of second inverter circuits being connected in series with the respective plurality of switches so as to constitute a plurality of series circuits whose number is identical with that of the plurality of second inverter circuits and that of the plurality of switches,
the plurality of series circuits being connected in parallel with each other between an output terminal of the first inverter circuit and an output of the driving circuit, and
the control section selectively operating the plurality of inverter circuits by controlling ON/OFF of each of the plurality of switches until (i) extraneous emission of an electromagnetic wave (EMI) from the touch panel satisfies a predetermined criterion, and (ii) touch location detection sensitivity of the touch panel satisfies a predetermined criterion, the control section changing a synthesis channel width of the plurality of second inverter circuits so as to change the lengths of rise time and fall time of each of the driving signals.

2. The touch panel controller as set forth in claim 1, wherein:
the plurality of second inverter circuits are configured by respective transistors that have different sizes.

3. The touch panel controller as set forth in claim 1, wherein:
the control section controls the lengths of rise time and fall time based on a control signal that has been supplied from outside of said touch panel controller.

4. The touch panel controller as set forth in claim 1, further comprising:
a receiving section that receives a sensing signal supplied via a sense line of the capacitive touch panel and thus detects electrostatic capacitance of the capacitive touch panel, the control section controlling the length of rise time and fall time based on an output signal supplied from the receiving section.

5. A touch panel device, comprising:
a capacitive touch panel; and
a touch panel controller that includes a plurality of driving circuits for driving respective drive lines of the capacitive touch panel by supplying driving signals to the respective drive lines,
the touch panel controller being a touch panel controller recited in claim 1.

6. An electronic information device, comprising:
a display for displaying an image; and
a touch panel device,
the touch panel device including:
a capacitive touch panel which is provided on the display, and
a touch panel controller that includes a plurality of driving circuits for driving respective drive lines of the capacitive touch panel by supplying driving signals to the respective drive lines,
the touch panel controller being a touch panel controller recited in claim 1.

* * * * *